Patented Aug. 15, 1939

2,169,330

UNITED STATES PATENT OFFICE 2,169,330

ORGANIC ESTERS OF CELLULOSE

George W. Seymour, Cumberland, Md., assignor to Celanese Corporation of America, a corporation of Delaware No Drawing. Application August 14, 1937, Serial No. 159,115

15 Claims. (Cl. 260—230)

This invention relates to the treatment of organic derivatives of cellulose, such as the organic esters of cellulose, to make them, when formed into articles and dyed, fast to light and acid fading and to prevent them from breaking down under the action of light and heat.

An object of the invention is the economic and expeditious production of organic derivatives of cellulose that are more stable than those heretofore produced. Another object of the invention is the production of organic derivatives of cellulose that when formed into yarns, filaments, films and fabrics do not become weak upon exposure to light, heat and/or industrial gases. Another object of the invention is the production of organic derivatives of cellulose which, when formed into yarns, films or fabrics and dyed, do not fade due to a change in the organic derivative of cellulose upon exposure to light, heat and/or industrial gases. Other objects of the invention will appear from the following detailed description.

In the production of organic derivatives of cellulose there are produced various compounds that are either unstable or become unstable upon ageing especially when subjected to light, heat, perspiration and/or industrial gases. Organic derivatives of cellulose containing these compounds and untreated, when formed into yarns or fabric and dyed, have a tendency to change color and also to lose strength. By treating the organic derivative of cellulose in accordance with this invention these compounds are either removed or converted into inactive compounds or are prohibited from exerting a detrimental effect on the organic derivative of cellulose.

By employing this invention, organic derivatives of cellulose are produced that are very stable and remain stable for long periods of time. Materials made from organic derivatives of cellulose prepared in accordance with this invention are greatly improved in their resistance to acid fading or light fading over organic derivatives of cellulose made prior to this invention.

Furthermore, cellulose esters treated in accordance with this invention are less corrosive than when treated by prior methods.

In accordance with this invention, precipitated or solid organic derivatives of cellulose are treated, preferably at elevated temperatures, with a solution or dispersion of a tertiary amine having at least two aryl group substitutions, the other substitution being either an aryl or alkyl group, for example, benzyl ethyl aniline. Such compounds may be termed tertiary amines derived from aryl aniline, although this term is not intended to limit the invention to the method of preparing the teritary amine.

This invention is especially applicable to the treatment of any organic ester of cellulose, such as cellulose acetate, cellulose formate, cellulose propionate and cellulose butyrate made by any process whatsoever and especially processes wherein an inorganic acid is employed as catalyst or wherein the chemicals entering into the esterification process contact compounds containing sulphur or inorganic acids. It is also applicable, by obvious modifications, to the treatment of nitrocellulose, cellulose ethers and mixed ester-ethers of cellulose. Examples of cellulose ethers are ethyl celluose, methy cellulose and benzyl celluose.

The organic esters of celulose that lend themselves to this invention may be made by any of the methods now employed to make the same. For example, cellulose (cotton linters, cotton, wood pulp, etc.) with or without a pretreatment in organic acid such as acetic acid and formic acid, is esterified by treating the same with an acid anhydride in the presence of an acid solvent and a catalyst. In place of the acid solvent or in connection therewith there may be used suspension liquids such as benzol. The acid solvent may be a concentrated acid corresponding to the anhydride employed or it may be, as is preferred, glacial acetic acid. Examples of catalysts are sulphuric acid, phosphorous acid, hydrochloric acid, zinc chloride and mixtures of these.

After esterification, sufficient water may be added to convert any remaining anhydride to the corresponding acid and the mixture hydrolyzed or ripened until the desired solubility characteristics are developed. The catalyst is then neutralized and water or other non-solvent for the ester added to precipitate the ester. The ester may also be extruded into a precipitating bath. During this precipitating step the ester may, if desired, be treated with a solution of a hypochlorite or other chlorine-liberating compound to reduce the color of same. The ester is then separated and washed free of the acid solution. If desired, the catalyst or a part thereof may be neutralized with a tertiary amine of the class used in stabilizing the ester.

An ester of cellulose prepared as above described or by any other method is then given a treatment in accordance with this invention to stabilize the same. This treatment comprises treating the ester with a tertiary amine having a least two aryl groups, the other group being either an aryl or alkyl group. Examples of such tertiary amines are benzyl ethyl aniline, benzyl methyl aniline, dibenzyl aniline, diphenyl aniline, etc. These compounds have the property of reacting with inorganic acids and not with the lower aliphatic acids. These compounds are applied to the ester in any suitable manner, preferably as a fine dispersion obtained by dissolving the tertiary amine in sulphuric acid and precipitating by neutralization with agitation. The quantity of tertiary amine applied may vary from 2% on the weight of the cellulose ester down to 0.1%. Approximately 40 to 60% tertiary amine applied is absorbed by the cellulose ester.

If desired, the tertiary amine may be applied to the cellulose ester from a dispersion of the amine in an aqueous bath or a bath containing both the tertiary amine and alcohol. The cellulose ester is submerged in the bath which is maintained at from 80° C. to 100° C. for from 10 minutes to 4 hours or longer. Also, if desired, the cellulose ester may be treated with a tertiary amine while in solution or while in a suspension such as a solution of cellulose acetate in acetone or a suspension of cellulose acetate in finely divided form in benzol.

It is preferable to have the precipitated cellulose ester in a finely divided form when treating the same with a tertiary amine. Cellulose ester in finely divided form may be obtained at the time it is precipitated from the ripening solution by vigorously beating in the water of precipitation effecting the production of the cellulose ester in a somewhat fibrous finely divided form. Also, the cellulose ester may be obtained in finely divided form by extruding the ripening solution through very fine orifices into a precipitating bath or by exploding the cellulose acetate by means of steam into a precipitating bath. The cellulose ester in finely divided form is readily penetrated by the tertiary amine which has a tendency to be absorbed thereby.

The ester after treatment may be washed, dried and dissolved in a solvent. The solution of the cellulose ester may be spun into filaments, formed into films, foils, etc. by the methods well known in the art.

In order to further describe the invention but not as a limitation, the following example is given:

*Example*

Ripened precipitated cellulose acetate in finely divided form after being washed is treated with a fine dispersion of benzyl ethyl aniline in an amount of from 0.4% to 1% on the weight of the cellulose acetate of benzyl ethyl aniline. The cellulose is again washed and dried, then dissolved in acetone and spun by the dry method of spinning into yarns. The yarns are dyed blue with a water insoluble dye having affinity for cellulose acetate. The yarns are found to be more stable than similar yarns made from cellulose acetate stabilized by steam or hot water methods. The yarns are exceptionally fast to light, heat and perspiration.

It is to be understood that the foregoing detailed description is merely given by way of illustration and that many variations may be made therein without departing from the spirit of my invention.

Having described my invention, what I desire to secure by Letters Patent is:

1. Process for stabilizing an organic substitution derivative of cellulose, which comprises treating an organic substitution derivative of cellulose which is unstable owing to the presence of impurities, in the finely divided solid form obtained by precipitation from solution, with a tertiary amine derived from aryl aniline, which amine is capable of reacting with inorganic acids but is inert to lower aliphatic acids.

2. Process for stabilizing an organic ester of cellulose, which comprises treating an organic ester of cellulose which is unstable owing to the presence of impurities, in the finely divided solid form obtained by precipitation from solution, with a tertiary amine derived from aryl aniline, which amine is capable of reacting with inorganic acids but is inert to lower aliphatic acids.

3. Process for stabilizing cellulose acetate, which comprises treating an cellulose acetate which is unstable owing to the presence of impurities, in the finely divided solid form obtained by precipitation from solution, with a tertiary amine derived from aryl aniline, which amine is capable of reacting with inorganic acids but is inert to lower aliphatic acids.

4. Process for stabilizing an organic substitution derivative of cellulose, which comprises treating an organic substitution derivative of cellulose which is unstable owing to the presence of impurities, in the finely divided solid form obtained by precipitation from solution, with a compound of the general formula $N.R_1R_2R_3$, where $R_1$ is an aryl group, $R_2$ is an aryl or an aralkyl group and $R_3$ is an aryl or an alkyl group, which compound is capable of reacting with inorganic acids but is inert to lower aliphatic acids.

5. Process for stabilizing cellulose acetate, which comprises treating an cellulose acetate which is unstable owing to the presence of impurities, in the finely divided solid form obtained by precipitation from solution, with a compound of the general formula $N.R_1R_2R_3$, where $R_1$ is an aryl group, $R_2$ is an aryl or an aralkyl group and $R_3$ is an aryl or an alkyl group, which compound is capable of reacting with inorganic acids but is inert to lower aliphatic acids.

6. Process for stabilizing an organic substitution derivative of cellulose, which comprises treating an organic substitution derivative of cellulose which is unstable owing to the presence of impurities, in the finely divided solid form obtained by precipitation from solution, with an aqueous dispersion of a compound of the general formula $N.R_1R_2R_3$, where $R_1$ is an aryl group, $R_2$ is an aryl or an aralkyl group and $R_3$ is an aryl or an alkyl group, which compound is capable of reacting with inorganic acids but is inert to lower aliphatic acids.

7. Process for stabilizing an organic substitution derivative of cellulose, which comprises treating an organic substitution derivative of cellulose which is unstable owing to the presence of impurities, in the finely divided solid form obtained by precipitation from solution, with an aqueous dispersion of benzyl ethyl aniline.

8. Process for stabilizing cellulose acetate, which comprises treating an cellulose acetate which is unstable owing to the presence of impurities, in the finely divided solid form obtained by precipitation from solution, with an aqueous dispersion of benzyl ethyl aniline.

9. Process for the production of stable organic esters of cellulose, which comprises esterifying cellulose, ripening the resulting cellulose ester, precipitating the cellulose ester from the ripening solution in a finely divided form, washing the precipitated cellulose ester, and then treating the precipitated cellulose ester with an aqueous dispersion of a compound of the general formula $N.R_1R_2R_3$, where $R_1$ is an aryl group, $R_2$ is an aryl or an aralkyl group and $R_3$ is an aryl or an alkyl group.

10. Process for the production of stable cellulose acetate, which comprises acetylating cellulose in the presence of sulphuric acid as catalyst, ripening the resulting cellulose acetate, precipitating the cellulose acetate from the ripening solution in a finely divided form, washing the precipitated cellulose acetate, and then treating the precipitated cellulose acetate with an aqueous dispersion of a compound of the general formula $N.R_1R_2R_3$, where $R_1$ is an aryl group, $R_2$ is an aryl or an aralkyl group and $R_3$ is an aryl or an alkyl group.

11. Process for stabilizing an organic ester of cellulose, which comprises treating at a temperature between 80 and 100° C. an organic ester of cellulose which is unstable owing to the presence of impurities, in the finely divided solid form obtained by precipitation from solution, with a compound of the general formula $N.R_1R_2R_3$, where $R_1$ is an aryl group, $R_2$ is an aryl or an aralkyl group and $R_3$ is an aryl or an alkyl group, which compound is capable of reacting with inorganic acids but is inert to lower aliphatic acids.

12. Process for stabilizing cellulose acetate, which comprises treating at a temperature between 80 and 100° C. an cellulose acetate which is unstable owing to the presence of impurities, in the finely divided solid form obtained by precipitation from solution, with a compound of the general formula $N.R_1R_2R_3$ where $R_1$ is an aryl group, $R_2$ is an aryl or an aralkyl group and $R_3$ is an aryl or an alkyl group, which compound is capable of reacting with inorganic acids but is inert to lower aliphatic acids.

13. Process for stabilizing an organic ester of cellulose, which comprises treating an organic ester of cellulose which is unstable owing to the presence of impurities, in the finely divided solid form obtained by precipitation from solution, with from 0.1 to 2%, based on the weight of the cellulose ester present, of a compound of the general formula $N.R_1R_2R_3$, where $R_1$ is an aryl group, $R_2$ is an aryl or an aralkyl group and $R_3$ is an aryl or an alkyl group, which compound is capable of reacting with inorganic acids but is inert to lower aliphatic acids.

14. Process for stabilizing cellulose acetate, which comprises treating an cellulose acetate which is unstable owing to the presence of impurities, in the finely divided solid form obtained by precipitation from solution, with an aqueous dispersion containing from 0.1 to 2%, based on the weight of the cellulose acetate present, of a compound of the general formula $N.R_1R_2R_3$, where $R_1$ is an aryl group, $R_2$ is an aryl or an aralkyl group and $R_3$ is an aryl or an alkyl group, the aqueous dispersion being maintained at a temperature of 80 to 100° C., which compound is capable of reacting with inorganic acids but is inert to lower aliphatic acids.

15. Process for stabilizing cellulose acetate, which comprises treating an cellulose acetate which is unstable owing to the presence of impurities, in the finely divided solid form obtained by precipitation from solution, with an aqueous dispersion containing from 0.1 to 2%, based on the weight of the cellulose acetate present, of benzyl ethyl aniline, the aqueous dispersion being maintained at a temperature of 80 to 100° C.

GEORGE W. SEYMOUR.